United States Patent [19]
Sawabe et al.

[11] Patent Number: 6,137,954
[45] Date of Patent: Oct. 24, 2000

[54] INFORMATION RECORD MEDIUM, APPARATUS FOR RECORDING THE SAME AND APPARATUS FOR REPRODUCING THE SAME

[75] Inventors: Takao Sawabe, Tokyo-to; Ryuichiro Yoshimura; Junichi Yoshio, both of Tokorozawa; Akihiro Tozaki, Tsurugashima; Yoshiaki Moriyama, Tsurugashima; Kaoru Yamamoto, Tsurugashima, all of Japan

[73] Assignee: Pioneer Electronic Corporation, Tokyo, Japan

[21] Appl. No.: 08/821,424

[22] Filed: Mar. 21, 1997

[30] Foreign Application Priority Data

Mar. 22, 1996 [JP] Japan .................................. 8-066403

[51] Int. Cl.[7] .............................. H04N 5/76; H04N 5/783
[52] U.S. Cl. .................................. 386/95; 386/68; 386/46
[58] Field of Search .................................. 386/83, 92, 46, 386/52, 113, 124, 1, 95, 68, 69; 348/7, 12; 360/32; H04N 5/76, 5/783

[56] References Cited

U.S. PATENT DOCUMENTS 5,574,567 11/1996 Cookson et al. ............................ 386/46

*Primary Examiner*—Robert Chevalier
*Attorney, Agent, or Firm*—Morgan, Lewis & Bockius LLP

[57] ABSTRACT

An information recording apparatus (SSI) is provided with: a signal process device (72) for applying a predetermined signal process to a plurality of partial record information blocks constructing whole record information (R) to thereby generate processed partial record information blocks (Sr) each composed of a plurality of predetermined information units (IU), and for generating and outputting recording position information (Sac), which is to be recorded by each of predetermined reproduction units (VOBU) composing the information units, for respective one of the reproduction units. The recording position information indicates recording positions of the reproduction units corresponding to reproduction times of the partial record information blocks within a predetermined range before and after the respective one of the reproduction units on an axis of reproduction time of each of the partial record information blocks. The information recording apparatus is also provided with; a multiplex device (75, 76) for multiplexing the processed partial record information blocks and the recording position information by each of the reproduction units to thereby output multiplexed partial record information (Sap); and a record device (77, 78) for recording the multiplexed partial record information onto the information record medium.

19 Claims, 16 Drawing Sheets

STRUCTURE OF INTERLEAVED UNIT

IU : INTERLEAVED UNIT

DSI DATA

- GENERAL INFORMATION
- SEAMLESS INFORMATION
- ANGLE JUMP
  DESTINATION INFORMATION
- VOB UNIT
  SEARCH INFORMATION
- SYNCHRONOUS
  REPRODUCTION INFORMATION

FIG. 7 structure of VOBU search information

| ADDRESS NUMBER | CONTENT |
|---|---|
| FWDA 240 | start address of VOBU to be reproduced 120 seconds after |
| FWDA 120 | start address of VOBU to be reproduced 60 seconds after |
| FWDA 60 | start address of VOBU to be reproduced 30 seconds after |
| FWDA 20 | start address of VOBU to be reproduced 10 seconds after |
| FWDA 15 | start address of VOBU to be reproduced 7.5 seconds after |
| FWDA 14 | start address of VOBU to be reproduced 7.0 seconds after |
| FWDA 13 | start address of VOBU to be reproduced 6.5 seconds after |
| FWDA 12 | start address of VOBU to be reproduced 6.0 seconds after |
| FWDA 11 | start address of VOBU to be reproduced 5.5 seconds after |
| FWDA 10 | start address of VOBU to be reproduced 5.0 seconds after |
| FWDA 9 | start address of VOBU to be reproduced 4.5 seconds after |
| FWDA 8 | start address of VOBU to be reproduced 4.0 seconds after |
| FWDA 7 | start address of VOBU to be reproduced 3.5 seconds after |
| FWDA 6 | start address of VOBU to be reproduced 3.0 seconds after |
| FWDA 5 | start address of VOBU to be reproduced 2.5 seconds after |
| FWDA 4 | start address of VOBU to be reproduced 2.0 seconds after |
| FWDA 3 | start address of VOBU to be reproduced 1.5 seconds after |
| FWDA 2 | start address of VOBU to be reproduced 1.0 second after |
| FWDA 1 | start address of VOBU to be reproduced 0.5 seconds after |
| BWDA 1 | start address of VOBU reproduced 0.5 seconds before |
| BWDA 2 | start address of VOBU reproduced 1.0 second before |
| BWDA 3 | start address of VOBU reproduced 1.5 seconds before |
| BWDA 4 | start address of VOBU reproduced 2.0 seconds before |
| BWDA 5 | start address of VOBU reproduced 2.5 seconds before |
| ⋮ | ⋮ |

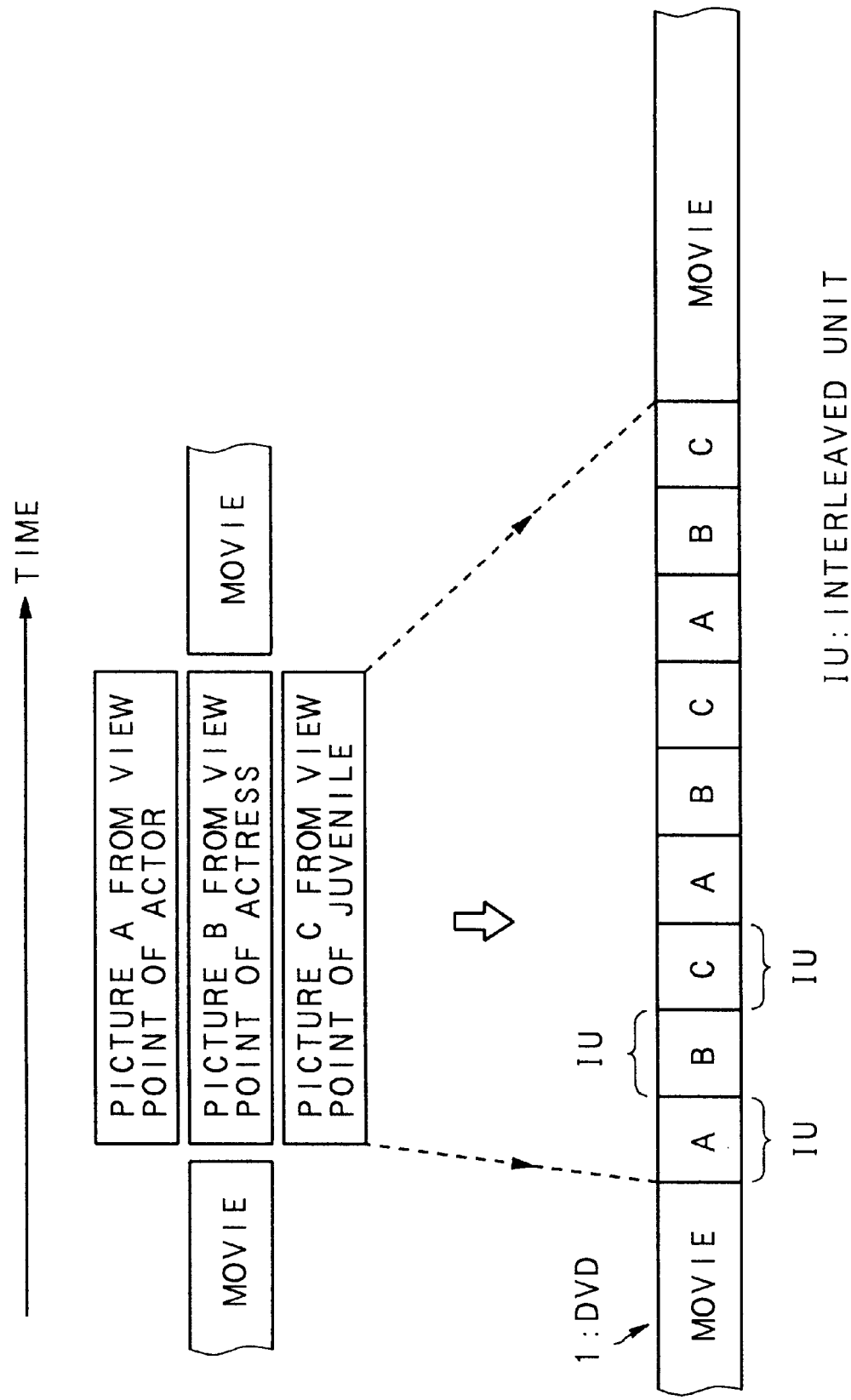

RELATION BETWEEN REPRODUCTION TIME AND RECORD INFORMATION DIVIDED INTO INTERLEAVED UNITS

FIG. 10

VOBU search information

Example 1

| ADDRESS NUMBER | CONTENT | VOBU ADDRESS |
|---|---|---|
| FWDA240 | start address of VOBU to be reproduced 120 seconds after | ... |
| FWDA120 | start address of VOBU to be reproduced 60 seconds after | ... |
| FWDA 60 | start address of VOBU to be reproduced 30 seconds after | ... |
| FWDA 20 | start address of VOBU to be reproduced 10 seconds after | ... |
| FWDA 15 | start address of VOBU to be reproduced 7.5 seconds after | ... |
| FWDA 14 | start address of VOBU to be reproduced 7.0 seconds after | ... |
| FWDA 13 | start address of VOBU to be reproduced 6.5 seconds after | ... |
| FWDA 12 | start address of VOBU to be reproduced 6.0 seconds after | ... |
| FWDA 11 | start address of VOBU to be reproduced 5.5 seconds after | ... |
| FWDA 10 | start address of VOBU to be reproduced 5.0 seconds after | 100 |
| FWDA 9 | start address of VOBU to be reproduced 4.5 seconds after | 86 |
| FWDA 8 | start address of VOBU to be reproduced 4.0 seconds after | 80 |
| FWDA 7 | start address of VOBU to be reproduced 3.5 seconds after | 73 |
| FWDA 6 | start address of VOBU to be reproduced 3.0 seconds after | 62 |
| FWDA 5 | start address of VOBU to be reproduced 2.5 seconds after | 50 |
| FWDA 4 | start address of VOBU to be reproduced 2.0 seconds after | 37 |
| FWDA 3 | start address of VOBU to be reproduced 1.5 seconds after | 30 |
| FWDA 2 | start address of VOBU to be reproduced 1.0 second after | 22 |
| FWDA 1 | start address of VOBU to be reproduced 0.5 seconds after | 10 |
| BWDA 1 | start address of VOBU reproduced 0.5 seconds before | ... |
| BWDA 2 | start address of VOBU reproduced 1.0 second before | ... |
| BWDA 3 | start address of VOBU reproduced 1.5 seconds before | ... |
| BWDA 4 | start address of VOBU reproduced 2.0 seconds before | ... |
| BWDA 5 | start address of VOBU reproduced 2.5 seconds before | ... |
| ⋮ | ⋮ | ⋮ |

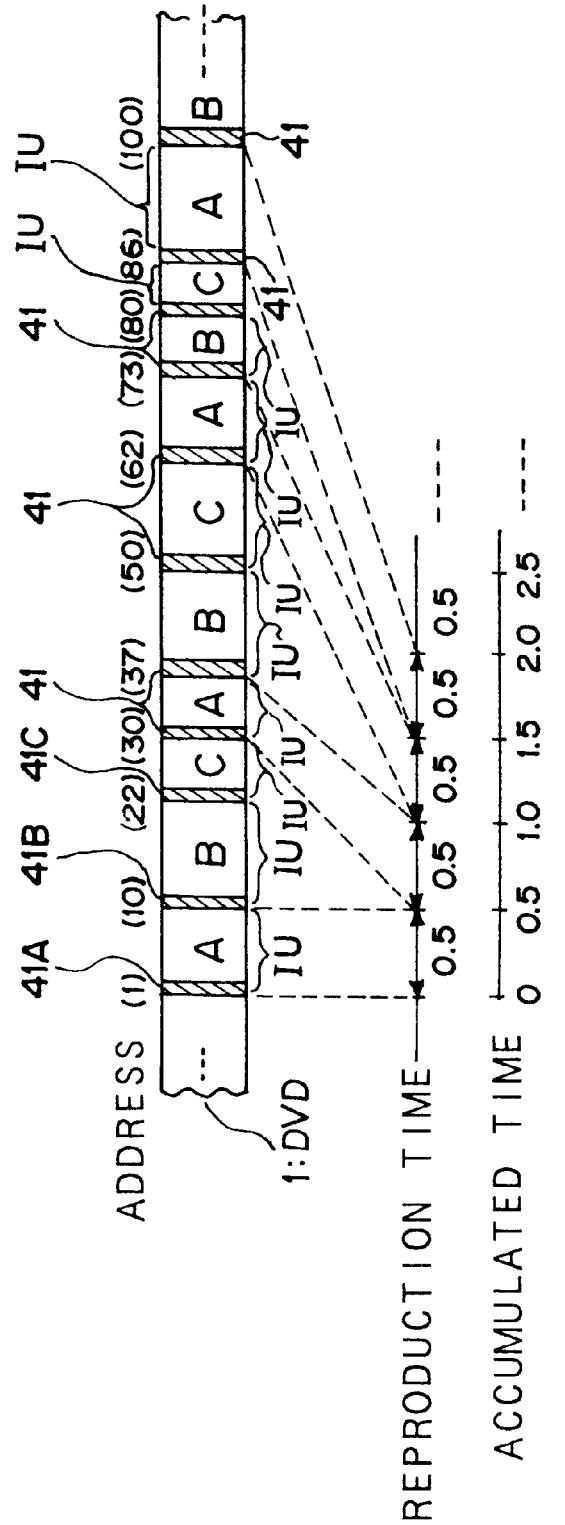

FIG. 12

VOBU search information

Example 2

| ADDRESS NUMBER | CONTENT | | | VOBU ADDRESS |
|---|---|---|---|---|
| FWDA240 | start address of VOBU to be reproduced | 120 | seconds after | ... |
| FWDA120 | start address of VOBU to be reproduced | 60 | seconds after | ... |
| FWDA 60 | start address of VOBU to be reproduced | 30 | seconds after | ... |
| FWDA 20 | start address of VOBU to be reproduced | 10 | seconds after | ... |
| FWDA 15 | start address of VOBU to be reproduced | 7.5 | seconds after | ... |
| FWDA 14 | start address of VOBU to be reproduced | 7.0 | seconds after | ... |
| FWDA 13 | start address of VOBU to be reproduced | 6.5 | seconds after | ... |
| FWDA 12 | start address of VOBU to be reproduced | 6.0 | seconds after | ... |
| FWDA 11 | start address of VOBU to be reproduced | 5.5 | seconds after | ... |
| FWDA 10 | start address of VOBU to be reproduced | 5.0 | seconds after | ... |
| FWDA 9 | start address of VOBU to be reproduced | 4.5 | seconds after | ... |
| FWDA 8 | start address of VOBU to be reproduced | 4.0 | seconds after | ... |
| FWDA 7 | start address of VOBU to be reproduced | 3.5 | seconds after | ... |
| FWDA 6 | start address of VOBU to be reproduced | 3.0 | seconds after | ... |
| FWDA 5 | start address of VOBU to be reproduced | 2.5 | seconds after | ... |
| FWDA 4 | start address of VOBU to be reproduced | 2.0 | seconds after | ... |
| FWDA 3 | start address of VOBU to be reproduced | 1.5 | seconds after | 86 |
| FWDA 2 | start address of VOBU to be reproduced | 1.0 | second after | 62 |
| FWDA 1 | start address of VOBU to be reproduced | 0.5 | seconds after | 30 |
| BWDA 1 | start address of VOBU reproduced | 0.5 | seconds before | ... |
| BWDA 2 | start address of VOBU reproduced | 1.0 | second before | ... |
| BWDA 3 | start address of VOBU reproduced | 1.5 | seconds before | ... |
| BWDA 4 | start address of VOBU reproduced | 2.0 | seconds before | ... |
| BWDA 5 | start address of VOBU reproduced | 2.5 | seconds before | ... |
| ⋮ | ⋮ | | ⋮ | ⋮ |

TIME SEARCH

INFORMATION RECORD MEDIUM, APPARATUS FOR RECORDING THE SAME AND APPARATUS FOR REPRODUCING THE SAME

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, with the conventional LD mentioned above, video image or audio sound cannot be reproduced in such an interactive and variegated manner that gives the audience several options in selecting video image to be displayed or audio sound to be played back.

For example, when watching a foreign movie recorded in an LD, the audience cannot select preferable language for the title credit (subscript) displayed on the screen (e.g., select either Japanese language or the original language). Similarly, when listening to the music in a CD, the audience cannot select a preferable version out of multiple versions of the same music piece (e.g., English lyrics or Japanese lyrics).

Further, it is very difficult to store different editing versions of one movie (e.g., an original version, a theater version, a video version, etc.) on one LD or the like, because even common portions must be recorded double or more for each of these versions. Thus, under the current technique, it is practically necessary to store only one of these versions on respective one of the different disks. Accordingly, the audience cannot select one of the different versions of the same movie from one disk.

Furthermore, since it is also impossible to record multiple versions of a scene taken from different camera angles simultaneously in one movie film, the audience cannot select an image of a preferable camera angle among different camera angles. Thus, fun and enjoyment of the audience is limited in this respect.

The conventional LD or the like cannot treat both of a moving picture and a still image simultaneously in the same scheme. For example, with a slide show composed of still images and associated audio sounds, it is impossible for the audience to search only the still image corresponding to an arbitrary reproduction time.

It is not realized yet to record one movie while grouping it into several data portions, such that a certain portion can be reproduced only by a specific reproducing apparatus (e.g., which allows only adults to reproduce it), and some other data portions can be reproduced by any reproducing apparatus. Also, a reproducing apparatus, which can automatically select the reproducible data portions to thereby reproduce it, is not proposed yet. Meanwhile, various proposals and developments as for the DVD, which is an optical disk having a memory capacity about ten times as much as that of the conventional CD without changing the size of the optical disk itself, are energetically being made nowadays. However, in case of recording onto the DVD the record information which can offer the multiple options to the audience in the aforementioned manner and which can reproduce the selected content of the record information correctly, reliably and promptly, various control informations must be recorded besides the various types of video information and audio information to be reproduced.

However, in this case, since different types of informations are recorded as the video and audio informations, and due to the complication in the relationships between these informations and the control informations to control them, there is raised such a problem that video images are interrupted or the relation between the video image and its associated audio sound is destroyed especially during a special reproduction, such as a fast forwarding, a so-called time search (i.e., a search based on time), a reverse reproduction and so on.

SUMMARY OF THE INVENTION

It is therefore an object of the present invention to provide: an information recording apparatus, which can record information onto an information record medium such that the special reproductions, such as the fast forwarding, the time search, the reverse reproduction etc., can be precisely and smoothly performed in correspondence with various reproducing conditions of the information record medium capable of the variegated reproduction; the information record medium recorded by this information recording apparatus; and an information reproducing apparatus, which can perform the special reproduction as well as the normal reproduction of this information record medium.

The above object of the present invention can be achieved by an information recording apparatus provided with: a signal process device for applying a predetermined signal process, such as a process based on the MPEG 2 method etc., to a plurality of partial record information blocks, such as angle blocks, parental blocks (explained later) etc., constructing whole record information to be recorded onto an information record medium, such as the DVD etc., to thereby generate processed partial record information blocks each composed of a plurality of predetermined information units, such as interleaved units etc., and for generating and outputting recording position information, such as VOB unit search information (explained later) etc., which is to be recorded by each of predetermined reproduction units, such as VOB units (explained later) etc., composing the information units, for respective one of the reproduction units, the recording position information indicating recording positions on the information record medium of the reproduction units corresponding to reproduction times of the partial record information blocks within a predetermined range before and after the respective one of the reproduction units on an axis of reproduction time of each of the partial record information blocks; a multiplex device, such as a controller, a multiplexer etc., for multiplexing the processed partial record information blocks and the recording position information by each of the reproduction units to thereby output multiplexed partial record information; and a record device, such as a mastering device etc., for recording the multiplexed partial record information onto the information record medium.

According to the information recording apparatus of the present invention, the predetermined signal process is applied to a plurality of partial record information blocks, so that the processed partial record information blocks each composed of a plurality of predetermined information units is generated and outputted by the signal process device. And that, the recording position information is also generated and outputted by the signal process device.

Then, the processed partial record information blocks and the recording position information are multiplexed by each of the reproduction units, so that the multiplexed partial record information is outputted by the multiplex device. Finally, the multiplexed partial record information is recorded onto the information record medium, by the record device.

Therefore, the recording position information, which indicates the recording positions on the information record medium of the reproduction units corresponding to reproduction times of the partial record information blocks within a predetermined range before and after the respective one of the reproduction units on the axis of reproduction time of each of the partial record information blocks, is recorded besides the processed partial record information blocks on the information record medium. Thus, by reproducing the partial record information blocks on the basis of the recording position information at the time of reproduction, it is possible to perform the special reproduction, such as the fast forwarding, the time search, the reverse reproduction and so on, smoothly for each of the partial record information blocks without interrupting the reproduction, even in case of performing the special reproduction with respect to the partial record information block, such as the angle block, the parental block and the like.

Accordingly, in the variegated reproduction of the record information, it is possible to perform the special reproduction of each of the partial record information blocks without interruption.

In one aspect of the information recording apparatus of the present invention, the signal process device applies the predetermined signal process to the partial record information blocks, which construct the record information including at least video information, which are to be reproduced at same one reproduction time on the axis of reproduction time, and each of which comprises respective one of the video informations regarding same one object taken from different viewpoints from each other.

According to this aspect, since the partial record information blocks are to be reproduced at same one reproduction time on the axis of reproduction time, and since each of the partial record information blocks comprises respective one of the video informations regarding same one object taken from different viewpoints from each other, it is possible to perform the special reproduction, such as the fast forwarding, the time search, the reverse reproduction and so on, smoothly without interrupting the reproduction, even in case of performing the special reproduction with respect to the video images regarding same one object taken from different viewpoints or camera angles.

In another aspect of the information recording apparatus of the present invention, the signal process device applies the predetermined signal process to the partial record information blocks, which are to be reproduced by information reproducing apparatuses having different setting modes from each other.

According to this aspect, since the partial record information blocks are to be reproduced by information reproducing apparatuses having different setting modes, it is possible to perform the special reproduction, such as the fast forwarding, the time search, the reverse reproduction and so on, smoothly without interrupting the reproduction, even in case of performing the special reproduction with respect to the partial record information blocks to be reproduced by information reproducing apparatuses having different setting modes.

The above object of the present invention can be also achieved by an information record medium, such as the DVD etc., recorded with record information to be reproduced by an information reproducing apparatus for performing a reproduction of a plurality of partial record information blocks composing the record information on the basis of recording position information recorded on the information record medium besides the record information. The information record medium has a data structure stored in the information record medium and including: processed partial record information blocks, which are generated by applying a predetermined signal process, such as a process based on the MPEG 2 method etc., to the partial record information blocks, such as angle blocks, parental blocks etc., and each of which is composed of a plurality of predetermined information units, such as interleaved units etc.; and the recording position information, such as VOB unit search information etc., which is to be recorded by each of predetermined reproduction units, such as VOB units etc., composing the information units, the recording position information indicating recording positions on the information record medium of the reproduction units corresponding to reproduction times of the partial record information blocks within a predetermined range before and after respective one of the reproduction units on an axis of reproduction time of each of the partial record information blocks, the processed partial record information blocks and the recording position information being multiplexed by each of the reproduction units.

According to the information record medium of the present invention, since the recording position information, which indicates the recording positions on the information record medium of the reproduction units corresponding to reproduction times of the partial record information blocks within a predetermined range before and after the respective one of the reproduction units on the axis of reproduction time of each of the partial record information blocks, as well as the processed partial record information blocks, are multiplexed and recorded, by reproducing the partial record information blocks on the basis of the recording position information at the time of reproduction, it is possible to perform the special reproduction, such as the fast forwarding, the time search, the reverse reproduction and so on, smoothly for each of the partial record information blocks without interrupting the reproduction, even in case of performing the special reproduction with respect to the partial record information block, such as the angle block, the parental block and the like.

Accordingly, in the variegated reproduction of the record information, it is possible to perform the special reproduction of each of the partial record information blocks without interruption.

In one aspect of the information record medium of the present invention, the record information includes at least video information. The partial record information blocks are to be reproduced at same one reproduction time on the axis of reproduction time. Each of the partial record information blocks comprises respective one of the video informations regarding same one object taken from different viewpoints from each other.

According to this aspect, since the partial record information blocks are to be reproduced at same one reproduction time on the axis of reproduction time, and since each of the partial record information blocks comprises respective one of the video informations regarding same one object taken from different viewpoints from each other, it is possible to perform the special reproduction, such as the fast forwarding, the time search, the reverse reproduction and so on, smoothly without interrupting the reproduction, even in case of performing the special reproduction with respect to the video images regarding same one object taken from different viewpoints or camera angles.

In another aspect of the information record medium of the present invention, the partial record information blocks are to be reproduced by information reproducing apparatuses having different setting modes from each other.

According to this aspect, since the partial record information blocks are to be reproduced by information reproducing apparatuses having different setting nodes, it is possible to perform the special reproduction, such as the fast forwarding, the time search, the reverse reproduction and so on, smoothly without interrupting the reproduction, even in case of performing the special reproduction with respect to the partial record information blocks to be reproduced by information reproducing apparatuses having different setting modes.

The above object of the present invention can be also achieved by an information reproducing apparatus for reproducing record information from the above described information record medium of the present invention. The information reproducing apparatus is provided with: a detection and demodulation device, such as an optical pickup, a demodulate and correct unit etc., for detecting and demodulating the processed partial record information blocks and the recording position information from the information record medium on the basis of a control signal, to thereby output a demodulation signal; an extract device, such as a system buffer etc., for extracting the recording position information out of the demodulation signal; and a control device, such as a system controller etc., for outputting the control signal on the basis of the extracted recording position information.

According to the information reproducing apparatus of the present invention, the processed partial record information blocks and the recording position information are detected and demodulated from the information record medium on the basis of a control signal, so that the demodulation signal is outputted by the detection and demodulation device. Then, the recording position information is extracted out of the demodulation signal, by the extract device. Then, the control signal is outputted on the basis of the extracted recording position information, by the control device.

According to the information reproducing apparatus of the present invention, since the recording position information is recorded on the information record medium besides the processed partial record information blocks, by reproducing the partial record information blocks on the basis of the recording position information, it is possible to perform the special reproduction, such as the fast forwarding, the time search, the reverse reproduction and so on, smoothly for each of the partial record information blocks without interrupting the reproduction, even in case of performing the special reproduction with respect to the partial record information block, such as the angle block, the parental block and the like.

Accordingly, in the variegated reproduction of the record information, it is possible to perform the special reproduction of each of the partial record information blocks without interruption.

In one aspect of the information reproducing apparatus of the present invention, the detection and demodulation device detects and demodulates the processed partial record information blocks, which constructs the record information including at least video information, which are to be reproduced at same one reproduction time on the axis of reproduction time, and each of which comprises respective one of the video informations regarding same one object taken from different viewpoints from each other.

According to this aspect, since the partial record information blocks are to be reproduced at same one reproduction time on the axis of reproduction time, and since each of the partial record information blocks comprises respective one of the video informations regarding same one object taken from different viewpoints from each other, it is possible to perform the special reproduction, such as the fast forwarding, the time search, the reverse reproduction and so on, smoothly without interrupting the reproduction, even in case of performing the special reproduction with respect to the video images regarding same one object taken from different viewpoints or camera angles.

In another aspect of the information reproducing apparatus of the present invention, the detection and demodulation device detects and demodulates the processed partial record information blocks which are to be reproduced by information reproducing apparatuses having different setting modes from each other.

According to this aspect, since the partial record information blocks are to be reproduced by information reproducing apparatuses having different setting modes, it is possible to perform the special reproduction, such as the fast forwarding, the time search, the reverse reproduction and so on, smoothly without interrupting the reproduction, even in case of performing the special reproduction with respect to the partial record information blocks to be reproduced by information reproducing apparatuses having different setting modes.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 5 is a diagram for explaining the information contained in DSI data;

FIG. 7 is a diagram showing a structure of the VOB unit search information;

FIG. 8 is a diagram showing the relationship between the video images for angle block reproduction and the interleaved units IU;

FIG. 10 is a diagram showing an example of the VOB unit search information;

FIG. 11 is a diagram showing the relationship between the recording information divided into the interleaved units and the corresponding reproduction time;

FIG. 12 is a diagram showing a concrete example of the VOB unit search information of the embodiment;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

information unit: interleaved unit
reproduction unit: VOBU (VOB(Video OBject)-Unit) processed partial
record information: angle block or parental block
recording position information: VOB unit search information (I) Embodiment of Information Record Medium First of all, a physical structure and a logical structure as well as an operation of a DVD, as one embodiment of the information record medium to which the present invention is applied, will be explained with reference to FIGS. 1 to 12.

Figure 1:
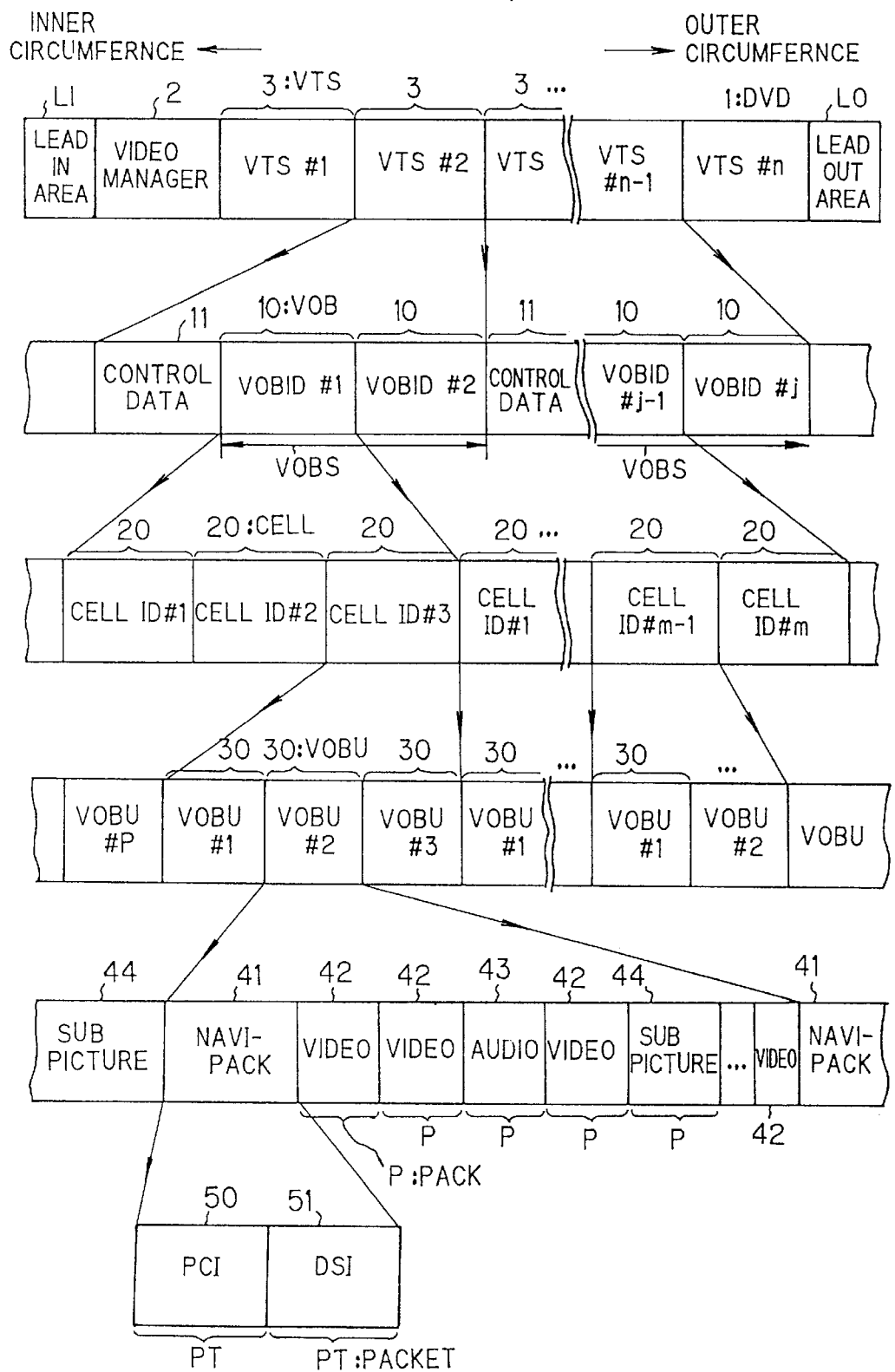
FIG. 1 is a diagram showing a physical structure of record information of a DVD as one embodiment of the present invention.

At first, a record format of video information and audio information on the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information (e.g. information indicative of a moving picture and information indicative of a still picture at the time of reproduction) and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of the audio information and sub picture information included therein, is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for showing a name of each title, information for preventing an illegal copy, an access table for accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes at least one of the video information, the audio information and sub picture information (which is defined as information of a sub picture such as a subtitle of a movie etc.), or each of which includes only a navi(navigation)-pack described later.

One VOB unit 30 is provided with: a navi-pack (a navigation pack) 41 for storing control information to control the video information etc. included in the pertinent VOB unit 30, as a control object; a video data 42 as the video information; an audio data 43 as the audio information; and a sub picture data 44 as the sub picture information. Here, in a pack P for the video data 42, only the video data is recorded. In a pack P for the audio data 43, only the audio data is recorded. Further, in a pack P for the sub picture data 44, only graphic data of a character, a diagram or the like as the sub picture, is recorded.

It is prescribed by a standard specification of the DVD that there are 8 kinds of audio recordable on the DVD 1 while 32 kinds of sub picture recordable on the DVD 1.

These data are recorded such that the reproduction time corresponding to one VOB unit 30 (i.e. the reproduction time corresponding to the data recorded between one navi-pack 41 and another navi-pack 41 adjacent to said one navi-pack 41) is not shorter than 0.4 seconds.

Further, there always exists the navi-pack 41 in one VOBU 30 at the head thereof. On the other hand, there may not exist each of the video data 42, the audio data 43 and the sub picture data 44 in one VOBU 30, or, even in case that the packs P for these data exist in one VOBU 30, the number of the packs P and the order of the packs P are freely determined.

Here, a division of each of the video data 42, the audio data 43 and the sub picture data 44 as shown in FIG. 1, is called as a pack P. Namely, in one VOB unit 30, the video data 42, the audio data 43 and the sub picture data 44 are divided into packs P respectively and recorded, wherein the pack P in which the video data 42 is recorded is called as a video pack, the pack P in which the audio data 43 is recorded is called as an audio pack, and the pack P in which the sub picture data 44 is recorded is called as a sub picture pack. These packs P are record units set in correspondence with a packing process in the MPEG 2 method, which is employed at the time of recording the record information onto the DVD 1 in the present embodiment.

Further, a reading start time information, which is called as a SCR (System Clock Reference), a start code indicating a start of the pack P and the like are recorded at a pack header recorded at the head of each pack P. This SCR indicates a reading start time on a time axis of reproduction time, at which reading the data included in each pack P from the track buffer in the reproducing apparatus described later and inputting the read data into each buffer are to be started. On the other hand, as for each pack P, the video data 42, the audio data 43 or the sub picture data 44 is recorded in each packet, which is generally a record unit obtained by dividing the pack P more finely. In the DVD 1 of the present embodiment, one pack P consists of one packet PT in general.

Finally, the navi-pack 41 is provided with: a DSI (Data Search Information) data 51 in a packet PT including search information to search a video image or an audio sound desired to be displayed or sound-outputted (concretely, search information such as an address, where the video or audio to be displayed or sound-outputted is recorded, on the DVD 1); and a PCI (Presentation Control Information) data 50 in a packet PT including information related to a display control at a time of displaying the video image or outputting the audio sound, which is searched on the basis of the information of the DSI data 51. Here, the DSI data 51 and the PCI data 50 construct, as the packets, a DSI packet and a PCI packet respectively, and then are recorded. Further, all video data 42 included in one VOBU 30 consist of at least one GOP (Group Of Pictures) each having an ID number.

In the PCI data 50, high light information, which defines a display or operation at a time when one selection item is selected out of selection items by the audience, is included. By the high light information, for example, the change of the picture plane display for a selection item as well as the display position to be changed in correspondence with the selection item, on a special picture plane of selection items (i.e. a so-called menu picture plane) for the audience to select, and the command corresponding to the selected item (i.e. a command to be performed in correspondence with the selected item) are set.

Further, the video information to construct and display a frame, a selection button and the like, which is required to construct and display the menu picture plane, is recorded in the sub picture data 44 as the sub picture information.

On the other hand, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The IPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Figure 2:
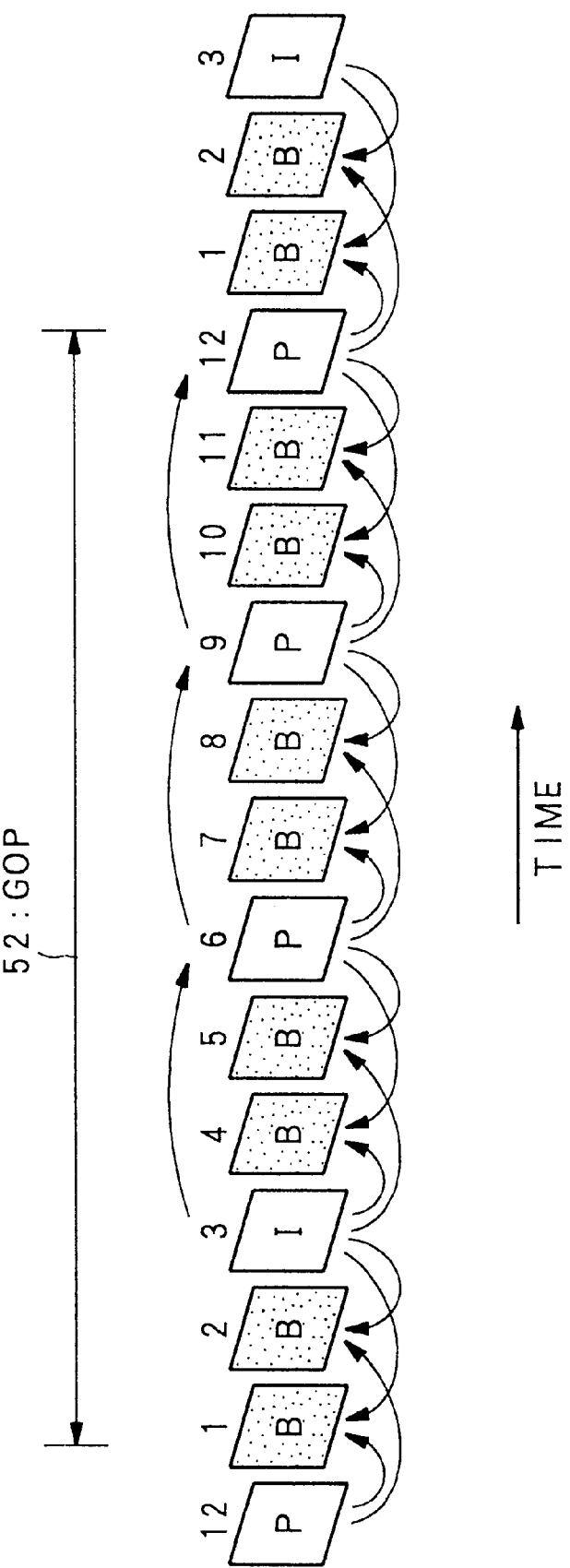
FIG. 2 is a diagram showing frame pictures constructing a GOP.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIGS. 1 to 3 by combining them (especially combining the cells 20) in the logical structure shown in FIG. 3, is recorded on the DVD 1, especially in the control data 11.

Figure 3:
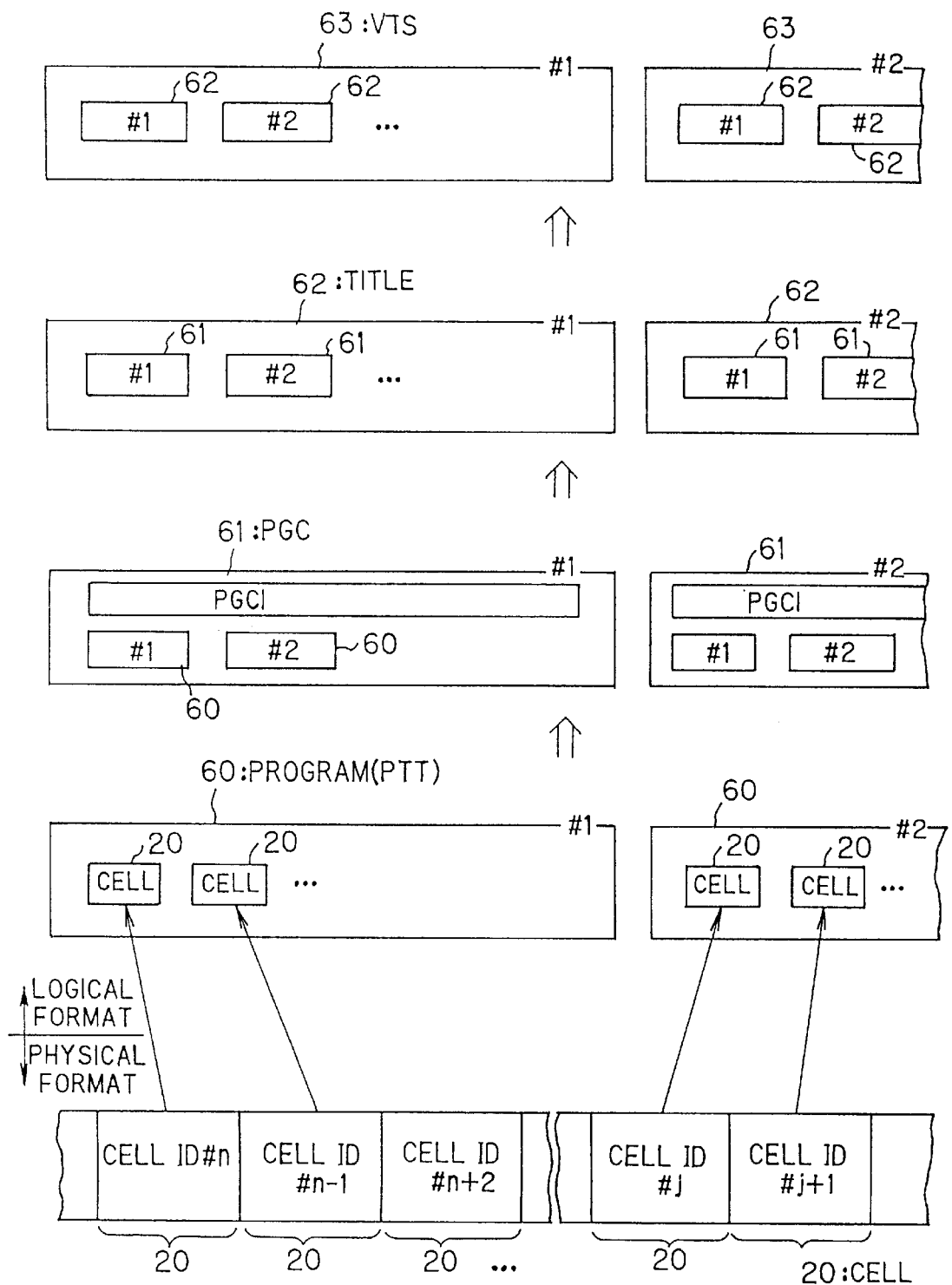
FIG. 3 is a diagram showing a logical structure of the record information of the DVD in FIG. 1.

To make the explanation clear, the following explanation is made from the lower hierarchical layer in FIG. 3. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 3. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 3. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 4.

Figure 4:
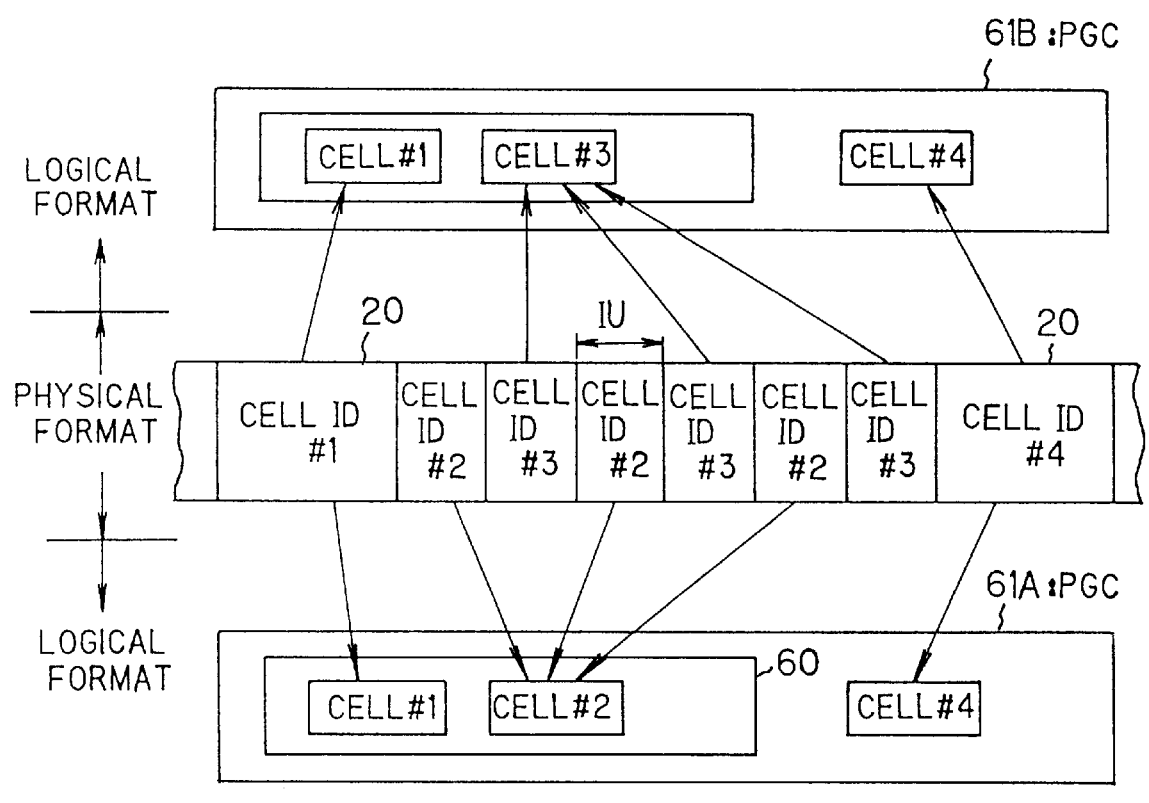
FIG. 4 is a diagram showing a structure of an interleaved unit of the DVD in FIG. 1.

Namely, as shown in FIG. 4, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at a track buffer of the reproducing apparatus described later (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Since it is necessary to record the information at various hierarchy classes explained above, the record information having the above explained recording format is suitable for an information record medium having a large memory capacity, such as the aforementioned DVD 1, which memory capacity is so large that audio voices or subtitles in various kinds of languages in addition to the movie itself can be recorded on a single optical disk as for the audio voice or subtitle of the movie.

Nextly, among the video information and the audio information having the above mentioned physical structure and logical structure, the DSI data 51 especially related to the present invention is explained with reference to FIG. 5.

In the DSI data 51, the search information to search the information to be reproduced and displayed, more concretely, the information to search the video image to be reproduced and displayed by the unit of the aforementioned VOB unit 30 and the information to perform the aforementioned seamless reproduction are recorded or described as aforementioned.

These informations are classified as following.

(1) information to set a timing of each constitutional element in the reproducing apparatus described later, at a time of starting a certain operation specified by the audience
 (2) information to recognize a position on the DVD 1, which corresponds to the data division on the logical structure shown in FIG. 3, of the optical pickup of the reproducing apparatus described later
 (3) information to write only the data to be reproduced and displayed into a track buffer of the reproducing apparatus described later
 (4) information to indicate a record position (i.e. a target or destination position) on the DVD 1 of the data to be accessed (detected)
 (5) protection information to protect the other data etc., if a desired data address cannot be searched at a time of searching the data for accessing.

Nextly, it is explained with reference to FIG. 5, how to concretely record each of the above mentioned informations in the DSI data 51, to which the information classified in the above mentioned manner are to be recorded.

As shown in FIG. 5, DSI data 51 includes several kinds of information. Namely, general information is used in common for one DSI data 51. Seamless information is used for seamless reproduction. Angle jump destination information is used for an angle reproduction, which will be described later. VOB unit search information is used to search a desired VOB unit 30. Synchronous reproduction information is related to the sub picture data 44 and the audio data 43, which are to be displayed and outputted in synchronization with the VOB unit 30 containing the pertinent DSI data 51. Among these information, the VOB unit search information is used especially in the special reproductions, such as the fast forwarding or the rewinding of the data while outputting video images, the N times speed reproduction (i.e. reproducing the data N times as fast as the normal speed), the time search (i.e. the search based on time) and so on.

The outline of the angle block reproduction using the angle jump destination information will now be described. It is possible for the DVD 1 of the present embodiment to store different video images of one scene taken from different standpoints or angles (i.e., camera angles) at the same time point on the time axis in one movie film (title 62). For example, an image seen through the actor's eyes and an image seen through the actress's eyes with respect to the same scene in the same movie film can be recorded. These images can be switched in response to the audience's selection by use of the menu screen based on the highlight information. This technique is called as the "angle block reproduction". Each video image corresponding to one of these different standpoints or angles is separately processed for each angle block reproduction. The video data from each angle is divided into the interleaved units IU and recorded on the DVD 1 as the angle block.

The record information, which is recorded on the DVD 1 in such a form that it is divided into the interleaved units IU, includes the record information for a parental block reproduction for each parental block, in addition to the record information for the angle block reproduction. The information for the parental block reproduction is also divided into a plurality of interleaved units IU. The parental block reproduction is such a reproduction technique as following. Namely, two types of video informations e.g. one for adults and one for juveniles (children) with respect to one same movie film are recorded as the respective parental blocks on the DVD 1. Then, both of these informations for adults and juveniles are permitted to be reproduced by one reproducing apparatus, which is set for adults, while only the information for juveniles is permitted (i.e., the information for adults is prohibited) to be reproduced by another reproducing apparatus, which is set for juveniles.

Nextly, each information shown in FIG. 5 is explained. The general information includes time information for controlling a track buffer in the reproducing apparatus described later, a recording position (logical address) on the DVD 1 of each data consisting the logical structure of FIG. 3, protection information for protecting other data when the address of one desired data is not detected during data search, and time information (e.g., time elapse information within the cell 20) for the time search in the reproducing apparatus described later.

The seamless information includes a recording position (logical address) on the DVD 1 of data required for the seamless reproduction, and the time information for setting connection timing of each reproduced picture plane in advance.

Further, the angle jump information includes address information indicating the recording position on the DVD 1 of each interleaved unit IU which is to be reproduced when the angle block reproduction is performed by seamlessly (continuously) switching the angles.

The VOB unit search information includes address information indicating recording positions on the DVD 1 of other VOB units 30 (other navi-packs 41) existing within a predetermined range (±2 minutes in the axis of reproduction time) at the vicinity of the pertinent DSI data 51 on the axis of reproduction time.

Finally, the synchronous reproduction information includes address information indicating the recording position on the DVD 1 of the sub picture data 44 or audio data 43, which is to be displayed or outputted in synchronization with the VOB unit 30 containing the pertinent DSI data 51.

By using the DSI data 51 containing several types of informations described above, the reproducing apparatus described later can smoothly reproduce the record information including the angle block or the parental block without discontinuation. The DSI data 51 also allows the reproducing apparatus to perform the scan reproduction, the time search etc. for each angle block or parental block.

Figure 6:
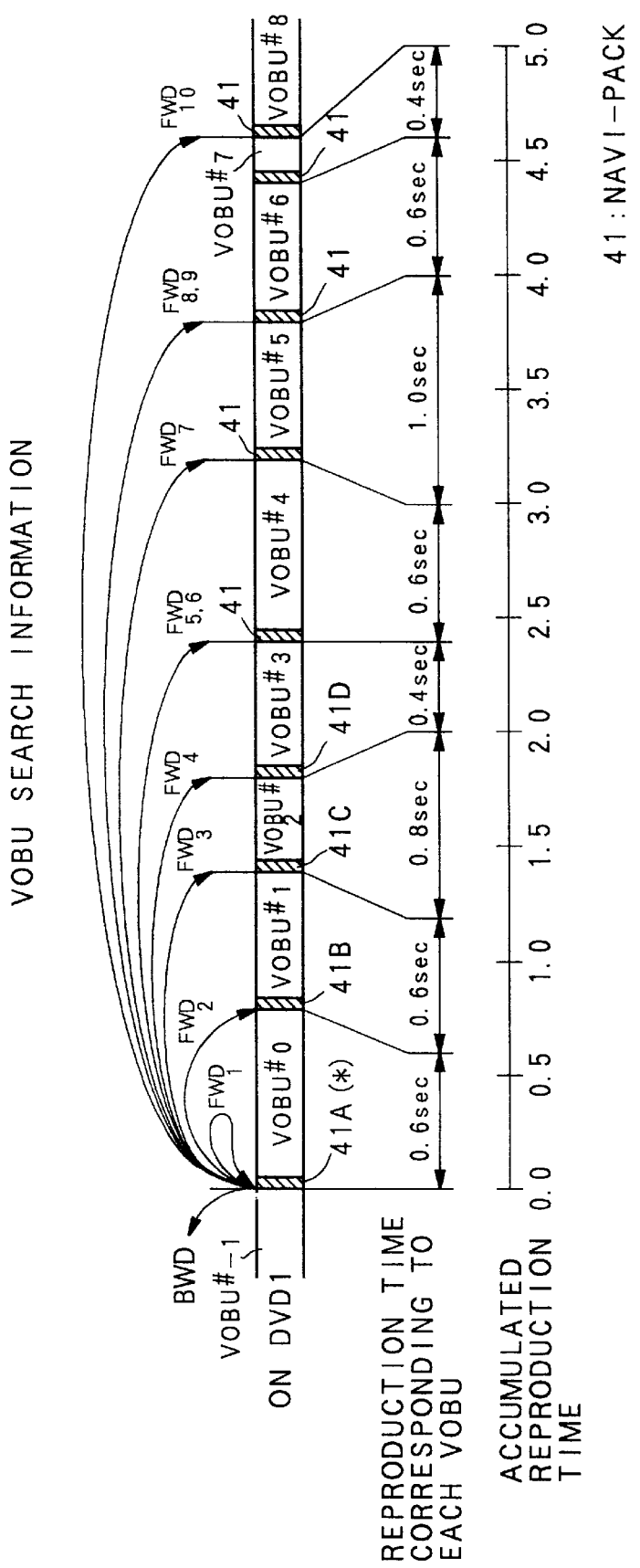
FIG. 6 is a diagram for explaining VOB unit search information.

Among the informations contained in the DSI data 51, the VOB unit search information will be explained in more detail, referring to FIG. 6. FIG. 6 shows the relationships among the information written as the VOB unit search information, the actual recording position on the DVD 1, and the reproduction time. In FIG. 6, "FWD" denotes that the recording position is located forward on the DVD 1 (i.e., later on the axis of reproduction time), and "BWD" denotes that the recording position is located backward on the DVD 1 (earlier on the axis of reproduction time).

As shown in FIG. 6, assuming a navi-pack 41A bearing a symbol as a current navi-pack 41, the VOB unit search information written in the navi-pack 41A includes the address informations indicating each recording position on the DVD 1 of the VOB unit 30 which is to be reproduced (0.5×n) seconds(n is a natural number) after the navi-pack 41A, or each recording position on the DVD 1 of VOB unit 30 which has been reproduced (0.5×n) seconds (n is a natural number) before the navi-pack 41A, for each time. More particularly, in the case shown in FIG. 6, the VOB unit search information corresponding to the FWD1 describes the VOB unit which is to be reproduced 0.5 seconds after the VOB unit #0 having the navi-pack 41A. In FIG. 6, since the VOB unit #0 has the reproduction time of 0.6 seconds, the VOB unit search information corresponding to the FWD1 describes an address indicating the recording position on the DVD 1 of the VOB unit #0 itself.

In the VOB unit search information corresponding to FWD2, the VOB unit, which is to be reproduced 1.0 (0.5×2) second after the VOB unit #0 having the navi-pack 41A, is described. In case of FIG. 6, since the reproduction time of the VOB unit #0 is 0.6 seconds, and the reproduction time of the VOB unit #1 is also 0.6 seconds, the VOB unit search information corresponding to FWD 2 has an address indicating an address indicating the recording position on the DVD 1 of the VOB unit 30, which is to be reproduced 1.0 second after the navi-pack 41A, i.e. the VOB unit #1. Similarly, the VOB unit search information within the navi-pack 41 has the addresses of the VOB units 30 located before and after 2 minutes from the pertinent navi-pack 41. FIG. 7 shows an example of the VOB unit search information described in this manner. In FIG. 7, "FWDA" denotes a forward address, and "BWDA" denotes a backward address. The subsequent address number corresponds to a number of (associated reproduction time×2).

Figure 9:
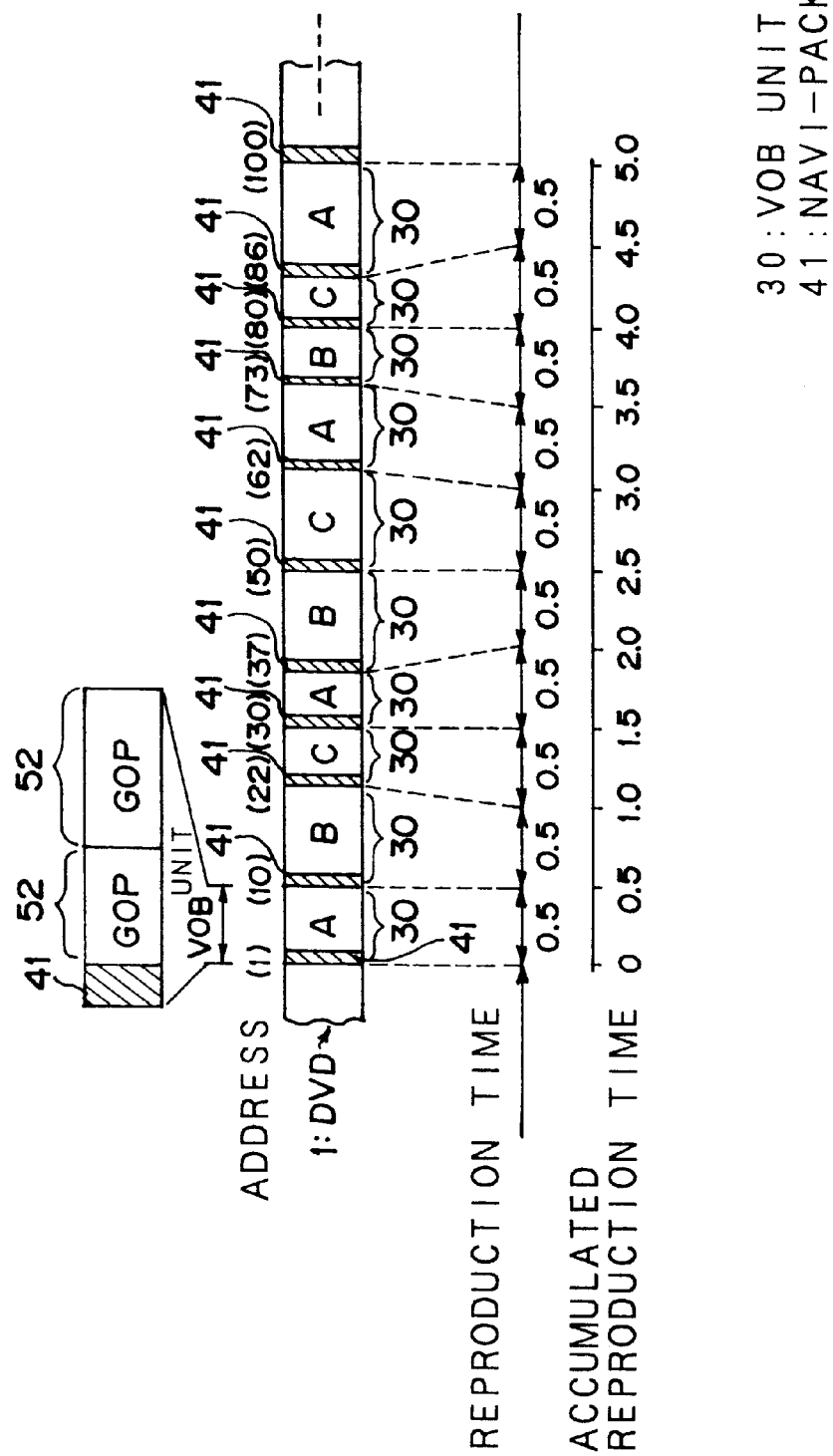
FIG. 9 is a diagram showing the relationship between the recording information divided into the interleaved units and the corresponding reproduction time.

Among the record information recorded on the DVD 1, the record information used for the angle block reproduction or parental block reproduction (angle block or parental block) is shown in FIG. 8. In FIG. 8, different types of video images corresponding to the same reproduction time are divided and interleaved to each other on the DVD 1. A video image A seen from the actor's viewpoint, a video image B seen from the actress's viewpoint, and a video image C seen from the juvenile (child) actor are divided into the interleaved units IU, and recorded in the order on the DVD 1. FIG. 9 shows the relationship between the reproduction time and the addresses indicating actual recording positions of these interleaved units IU in FIG. 8, on the DVD 1. In FIG. 9, for the purpose of simplifying the explanation, it is assumed that one interleaved unit IU is composed of one VOB unit 30, and that the reproduction time of each VOB unit 30 is 0.5 seconds. Furthermore, because the data amounts of the VOB units 30 differ from each other due to the MPEG 2 method employing the variable rate compression technique, the intervals between the start addresses corresponding to the respective VOB units 30 also differ from each other.

FIG. 10 shows an example of the VOB unit search information, in which the addresses of the VOB units 30 of FIG. 9 are applied to the structure of the VOB unit search information of FIG. 7.

Assuming that it is tried to watch the video image 2 seconds forward during the reproduction of the image A by the scan operation or the like, by use of the VOB unit search information of FIG. 10, the data 2 seconds forward is the data recorded at the address (37), which is included in the image B as indicated by FIG. 9. In other words, as for the record information divided into the interleaved units IU, the use of only the VOB unit search information of FIG. 10 is not sufficient to perform the scan operation, the time search etc., for each partial record information (i.e., the image A, the image B, or the image C), because the VOB unit search information of FIG. 10 describes the start address on the DVD 1 of each VOB unit 30 associated with the reproduction time. In order to perform the scan operation or the time search for each partial record information, some other information must be used together in addition to the VOB unit search information.

To overcome this problem, only those addresses of the interleaved units IU which are to be continuously reproduced are described as the VOB unit search information in the present embodiment.

More particularly, in the VOB unit search information described in the DSI data 51 within the navi-pack 41A in FIG. 11, the addresses of the interleaved units IU, which are to be continuously reproduced as the image A (e.g., the addresses (30), (62) and (86) in FIG. 11) are described in association with the time when those interleaved units IU are reproduced. Similarly, the VOB unit search information described in the navi-pack 41B of FIG. 11 has the addresses (37), (73) and (100) of the interleaved units IU, which are to be continuously reproduced as the image B, in association with the reproduction time of the pertinent interleaved units IU. The VOB unit search information described in the navi-pack 41C of FIG. 11 has the addresses (50) and (80) of the interleaved units IU, which are to be continuously reproduced as the image C, in association with the reproduction time of the pertinent interleaved units IU. An example of the VOB unit search information described in the navi-pack 41A in the above mentioned manner is shown in FIG. 12, in which the address of each interleaved unit IU is described.

In this way, by constructing the VOB unit search information only with those addresses of the interleaved units IU which are to be continuously reproduced, the special reproduction, such as the time search, the fast forwarding, the scan operation etc., can be smoothly performed even during the reproduction of the angle block or after switching-over of the angles.

The structure of the VOB unit search information described above can be applied, not only to the reproduction of the angle block, but also to the reproduction of the parental block, in which information is recorded as the interleaved units IU.

(II) Embodiment of Recording Apparatus

Next, an embodiment of recording apparatus for recording the above mentioned control information, video information and audio information onto the DVD 1 will be explained with reference to FIG. 13.

At first, a construction and an operation of the recording apparatus as the embodiment is explained with reference to FIG. 13.

Figure 13:
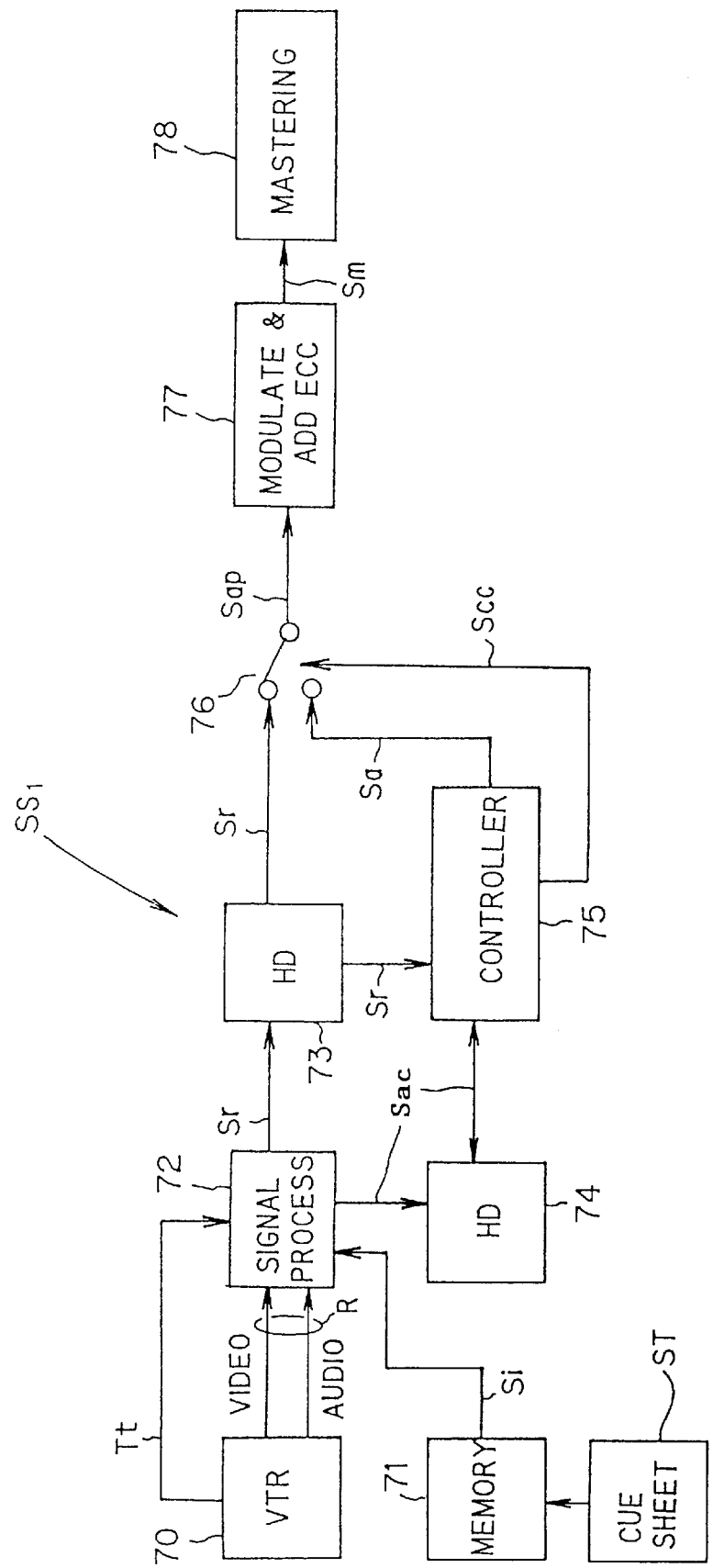
FIG. 13 is a block diagram of an information recording apparatus, as another embodiment of the present invention.

As shown in FIG. 13, a recording apparatus SS1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1 (which includes the above mentioned video informations corresponding to the above mentioned video images A to C), is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process to the record information R outputted from the VTR 70, separating it into the respective video informations corresponding to the video images A, B and C, and applies a signal compressing process by the MPEG 2 method for each of the separated video informations, time-axis-multiplexes the audio information and the video information and makes a space corresponding to the navi-pack 41 at a position to insert the navi-pack 41 to be multiplexed and recorded with the audio information and the video information, to output it as a compressed multiplexed signal Sr. After that, the compressed multiplexed signal Sr outputted therefrom is temporarily stored into the hard disk device 73.

Along with this, the memory 71 temporarily stores various control informations which are inputted beforehand on the basis of a cue sheet ST, on which the various control informations for controlling the reproduction of the record information R (i.e. the video manager 2, the control data 11, the navi-pack 41 (the PCI data 50 and the DSI data 51 including the above described VOB unit search information, and so on in FIG. 1) are written. Then, the memory 71 outputs it as a control information signal Si on the basis of a request from the signal process unit 72.

Then, the signal process unit 72 separates the DSI data including the above described VOB unit search information from the control information and outputs a search information signal Sac corresponding to it with referring to a time code Tt, on the basis of the time code Tt corresponding to the record information R outputted from the VTR 70 and the control information signal Si outputted from the memory 71. Then, the search information signal Sac is temporarily stored in the hard disk device 74. At this time, although illustrations of the control informations stored in the memory 71 other than the DSI data 51 are omitted in FIG. 13, they are generated in the signal process unit 72, and are stored in the hard disk device 74, in the same manner as the DSI data 51.

The above described processes are performed with respect to the whole record information R.

When the above described processes are finished as for the whole record information R, the controller 75 reads out the compressed multiplexed signal Sr from the hard disk device 73, reads out the search information signal Sac and other control information from the hard disk device 74, generates each of additional information including the DSI data 51, which contains the VOB unit search information (refer to FIG. 12), and other control information independently on the basis of these read out signals, and stores an additional information signal Sa corresponding to this generated additional information into the hard disk device 74. This is because there may be a control signal, which content is determined in dependence upon a generation result of the compressed multiplexed signal Sr among various control signals.

On the other hand, the controller 75 performs a time management for each of the operations of the signal process unit 72, the hard disk device 73 and the hard disk device 74, and reads out the additional information signal Sa from the hard disk device 74, and generates and outputs an information selection signal Scc to time-axis-multiplex the compressed multiplexed signal Sr and the additional information signal Sa.

After that, the compressed multiplexed signal Sr (which respectively includes the video information corresponding to each of the video images A, B and C) and the additional information signal Sa are time-axis-multiplexed by the multiplexer 76 to be outputted as an information added compressed multiplexed signal Sap in which the control information such as the DSI data 51 etc. within the additional information corresponding to the additional information signal Sa are described into the aforementioned space for the navi-pack 41. At the stage of this information added compressed multiplexed signal Sap, the record information R has such a physical structure that the control information, the video information and the audio information are synthesized by the switching-over operation by the controller 75 by use of the information selection signal Scc, and are divided into the interleaved units IU for each of the video informations as shown in FIGS. 1 and 11. Further, the above described VOB unit search information is included in the corresponding DSI data 51 and thus included in the corresponding navi-pack 41.

If there exists the sub picture information to be recorded, it is inputted, by other means such as a hard disk device not illustrated, to the signal process unit 72, so that it is processed in the same manner as the video and audio information thereat.

Then, the modulator 77 adds an error correction code (ECC), such as a Reed Solomon code, and applies a modulation such as an eight to sixteen (8-16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

By the above explained operation of the information recording apparatus SS1, the record information R including the above described VOB unit search information is recorded on the DVD 1.

Therefore, at the time of reproducing the record information recorded in this manner, the video information to be reproduced can be speedily searched and reproduced even during the angle block reproduction or the parental block reproduction, by use of the above described VOB unit search information. Thus, it is possible to perform the special reproduction such as the scan operation, the time search etc., while reproducing the video information precisely and smoothly without temporarily interrupting the reproduction.

(III) Embodiment of Reproducing Apparatus

Next, an embodiment of reproducing apparatus for reproducing the information recorded on the DVD 1 by the above mentioned recording apparatus SS1 will be explained with reference to FIGS. 14 to 16.

At first, a construction and an operation of the reproducing apparatus as the embodiment is explained with reference to FIG. 14.

Figure 14:
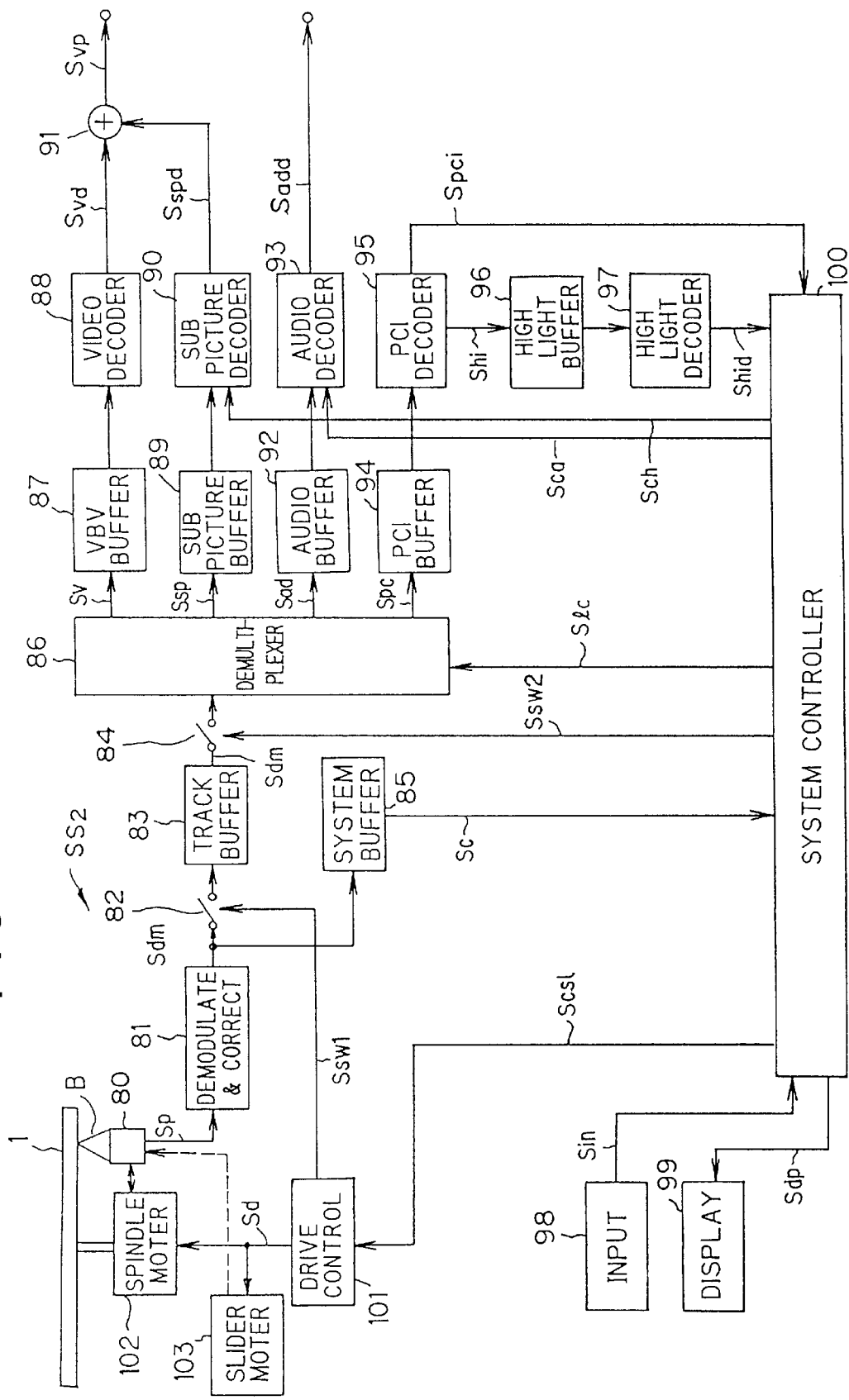
FIG. 14 is a block diagram of an information reproducing apparatus as another embodiment of the present invention.

As shown in FIG. 14, a reproducing apparatus SS2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 14 only illustrates the portions related to the video and audio reproduction of the reproducing apparatus SS2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. Then it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the management information (e.g. the video manager 2) related to the whole information recorded on the DVD 1 which is detected firstly upon loading the DVD 1, or the control information 11 for each VTS 3. Then, the system buffer 85 outputs the accumulated data as one portion of a control information Sc to the system controller 100, and temporarily stores the DSI data 51 for each navi-pack 41 (refer to FIG. 1) while reproducing the information, to output it as another portion of the control information Sc.

The demultiplexer 86, to which the demodulation signal Sdm is continuously inputted through the stream switch 84, separates the video data 42, the audio data 43, the sub picture data 44 and the PCI data 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio data 43 or the sub picture data 44 in a plurality of different languages are included as the audio or sub picture information. In that case, a desirable language is selected for the audio or sub picture information by a stream selection signal S1c from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method (refer to FIG. 2). Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture data 44 included in the sub picture signal Ssp with the video data 42 corresponding to the sub picture data 44, and to output it. Then, the sub picture signal Ssp synchronized with the video data 42 is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, on the basis of the header control signal Shc outputted from the system controller 100, and it is outputted as a decoded audio signal Sadd to a speaker etc. not illustrated.

If it is detected by the system controller 100 that it is necessary to temporarily stop (pause) the audio voice in the reproduction immediately after accessing the desired information, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI data 50, which is included in the PCI signal Spc, with the video data 42, the audio data 43 and the sub picture data 44 corresponding to the PCI data 50, and apply the PCI data 50 to the video data 42, the audio data 43 and the sub picture data 44. Then, from the PCI signal Spc, which is synchronized with the corresponding the video data 42, the audio data 43 or the sub picture data 44 by the PCI buffer 94, high light information included in the PCI data 50 is separated or extracted by the PCI decoder 95, and is outputted as a high light signal Shi to the high light buffer 96. The portion of the PCI data 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. The information to set the value of the register in the system controller 100 is included in this decoded high light signal Shid.

Here, the system controller 100 outputs the aforementioned high light control signal Sch to change the display condition by the high light information, on the basis of the decoded high light signal Shid.

Further, on the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, a stream selection signal (e.g. a language selection signal) S1c, the pause signal Sca and the high light control signal Sch to correctly perform the reproduction corresponding to those input signals, and also outputs a display signal Sdp to display an operation condition etc. of the reproducing apparatus SS2 to the display unit 99 such as the liquid crystal device.

Furthermore, the system controller 100 outputs a seamless control signal Scs1 corresponding to the track jump process, to the drive controller 101, when it detects by the control signal Sc etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 14), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Next, among the operations of the reproducing apparatus SS2, the search operation using the VOB unit search information of the present invention will be explained, mainly as for the operation of the system controller 100.

(A) J Times Speed Visual Scan Operation

Figure 15:
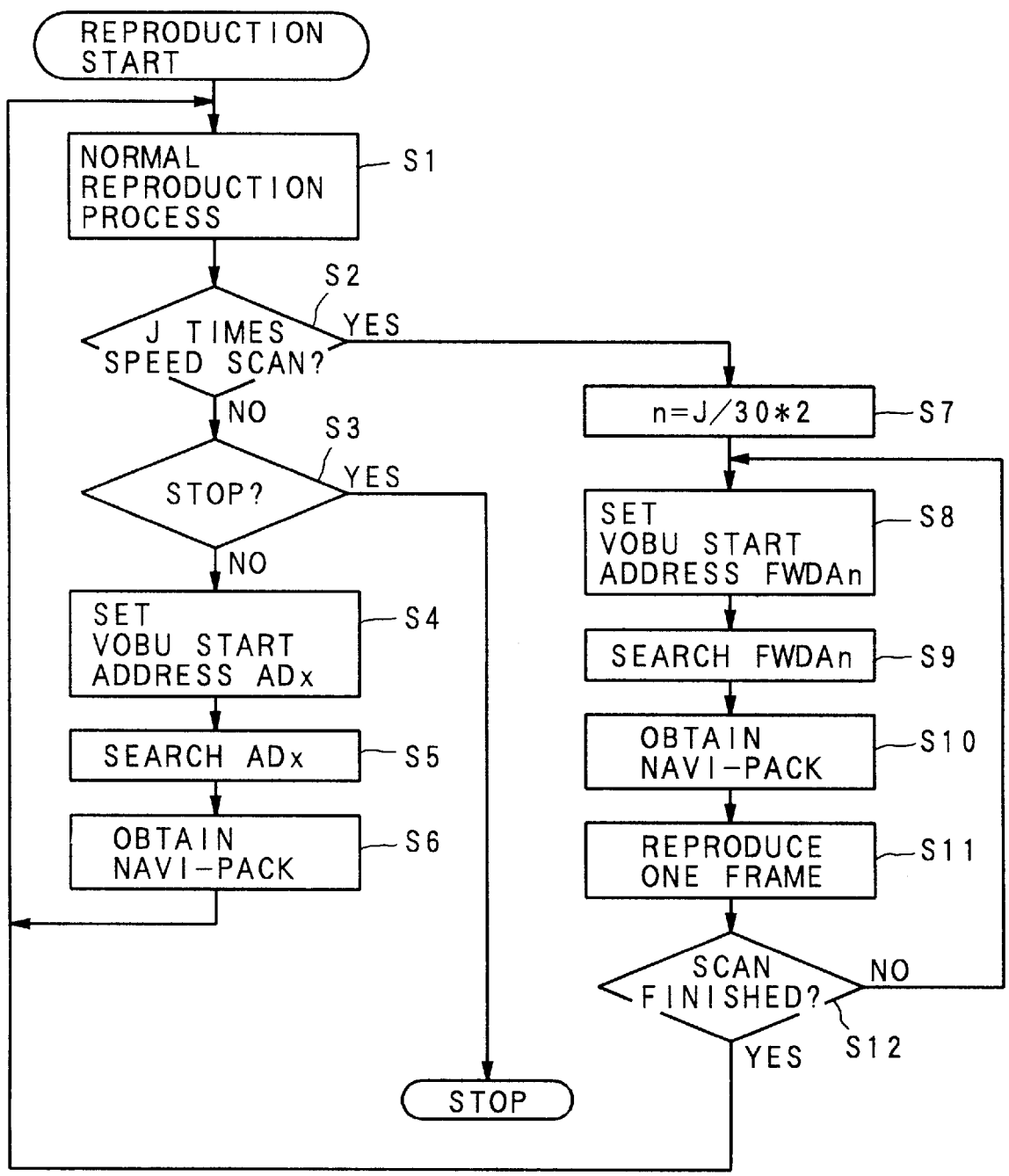
FIG. 15 is a flowchart showing a J times speed scan operation according to the embodiment.

At first, it is explained a J times speed visual scan operation, which is a visual scan operation J times as fast as the normal speed by use of the VOB unit search information during the angle block reproduction or parental block reproduction, with referring to FIG. 15 (more concretely, which is a visual scan operation 10 times, 30 times etc. as fast as the normal speed while outputting the video images).

The visual scan J times as fast as the normal speed (hereinafter, referred to as "J times speed scan") during the angle block reproduction or the parental block reproduction is to successively reproduce only the images of frames, each of which corresponds to J/30 seconds and is included in the VOB unit 30, which is to be continuously reproduced, of every J/30 seconds in the normal reproduction, from the location of the navi-pack 41 corresponding to the current data being reproduced. Since, in the MPEG 2 method, the number of frame images reproduced in one second is prescribed as 30 frames, as the images of every J frames are reproduced while the images of every (J−1) frames are skipped in this manner, the reproduction speed becomes J times as faster as the normal speed.

The actual operation of the J times speed scan will be explained, with referring to the flowchart of FIG. 15. For simplifying the explanation, it is assumed that all of the VOB units 30 contain the video data 42.

Before the J times speed scan starts, the normal reproduction is performed (step S1). During the normal reproduction, it is judged whether or not the signal Sin to instruct the J times speed scan is inputted through the input unit 98 (step S2).

If the signal Sin to instruct the J times speed scan is not inputted (step S2: NO), it is further judged whether or not a reproduction stop command is inputted through the input unit 98 (step S3). If there is a reproduction stop command (step S3: YES), the reproduction is stopped and the process ends. If there is no reproduction stop command (step S3: NO), the start address ADx of the VOB unit 30 which is to be reproduce next is set (step S4). To search this address ADx, the pickup 80 is moved (step S5), and the navi-pack 41 of the next VOB unit 30 is obtained (step S6). The flow returns to the step S1 to continue the normal reproduction.

On the other hand, at the step S2, if the signal Sin to instruct the J times speed scan is inputted (step S2: YES), the parameter "n" indicating the address number (having the value of "2× reproduction time", refer to FIG. 12) of the VOB unit search information is set to "(J/30)×2" (step S7), so as to perform the VOB unit 30 which is (J/30) seconds after the current position. Then, "FWDAn" indicative of the start address of the VOB unit 30 which is to be reproduced (J/30) seconds later is set by referring to the VOB unit search information (step S8). Then, the VOB unit 30 at the FWDAn is searched (step S9), and the navi-pack 41 contained in the pertinent VOB unit 30 which is to be reproduced (J/30 seconds) later is obtained (step S10).

Then, only one frame every J/30 seconds is reproduced in the VOB unit 30 corresponding to the obtained navi-pack 41 (step S11). After than, it is judged whether or not the scan operation is finished (step S12). If the scan operation is not finished yet (step S12: NO), the flow returns to the step S8 so as to repeat the steps 8 through 11. If the scan operation is finished (step S12: YES), the flow returns to the normal reproduction (step S1).

In this way, the J times speed scan can be performed during the angle block reproduction or parental block reproduction, by reproducing one frame every J/30 seconds by use of the VOB unit search information.

(B) Time Search

Next, the time search by use of the VOB unit search information during the angle block reproduction or parental block reproduction will be explained with referring to FIG. 16.

The time search during the angle block reproduction or parental block reproduction is such an action as skipping from the current reproduction location to a video image or audio sound at the designated time (e.g., after T seconds) and outputting the searched video image or audio sound.

Figure 16:
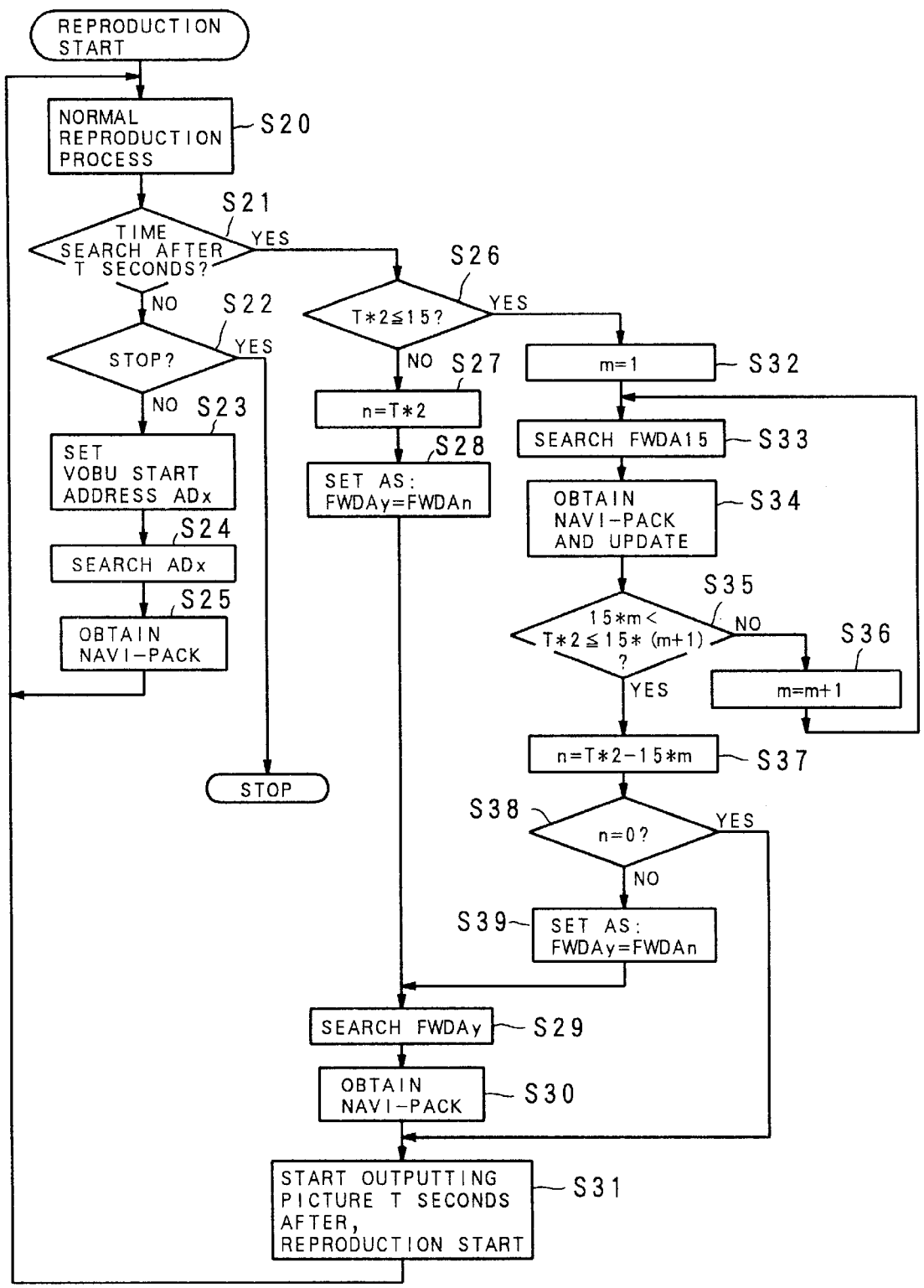
FIG. 16 is a flowchart showing a time search operation according to the embodiment.

A concrete operation for searching the video image or audio sound of after T seconds by use of the VOB unit search information is shown in the flowchart of FIG. 16. To simplify the explanation, it is assumed that all of the VOB units 30 contains the video data 42.

As shown in FIG. 16, before the time search starts, the normal reproduction process is performed (step S20). During the normal reproduction, it is judged whether or not the input signal Sin to instruct the time search for reproducing the video image or audio sound of after T seconds is inputted (step S21).

If the signal Sin to instruct the time search of after T seconds is not inputted (step S21: NO), it is further judged whether or not the reproduction stop command is inputted through the input unit 98 (step S22). If the reproduction stop command is inputted (step S22: YES), the reproduction is stopped. If the reproduction stop signal is not inputted (step S22: NO), the start address ADx of the next VOB unit 30 is set (step S23). Then, the pickup 80 is moved to search the set address ADx (step S24), and the navi-pack 41 of the VOB unit 30 which is to be nextly reproduced is obtained (step S25). Then, the flow returns to the normal reproduction (step S20).

On the other hand, at the step S21 if the input signal Sin to instruct the time search of after T seconds is inputted (step S21: YES), it is judged whether or not the value "T×2" (corresponding to the aforementioned address number, refer to FIG. 12) is smaller than or equal to 15 (step S26).

At the step S26, if the value "T×2" is smaller than or equal to 15 (step S26: YES), the parameter "n" indicating the address number is set to T×2 (step S27).

Then, the start address (written as the address corresponding to "FWDAn" in the VOB unit search information) of the VOB unit 30 which is to be reproduced after T seconds is obtained from the VOB unit search information (refer to FIG. 12), and is set as "FWDAy" such that the address corresponding to "FWDAn" equals the address corresponding to "FWDAy" (step S28).

After that, the pickup 80 is moved to search the VOB unit 30 recorded in the address corresponding to "FWDAy" (step S29), and the navi-pack 41 of the pertinent VOB unit 30 is obtained (step S30). Then, the reproduction starts from the pertinent VOB unit 30 and the video image, which is to be reproduced after T seconds, is outputted (step S31). Then, the flow returns to the normal reproduction (step S20).

On the other hand, at the step S26, if the value T×2 is larger than 15 (step S26: NO), the parameter "m" indicating the number of times for searching the VOB unit 30 every 7.5 seconds (corresponding to "FWDA15" in the VOB unit search information of FIG. 12) is set to "1" (step S32). Then, the pickup 80 is moved to search the VOB unit 30 corresponding to "FWDA15" of the VOB unit search information (step S33), and the navi-pack 41 of the pertinent VOB unit 30 is obtained (step S34).

Next, as for the value "T×2" (address number), it is judged whether or not the value T×2 is greater than "15×n" and less than or equal to "15×(m+1)" (i.e., 15×m<T×2<15×(m+1)) (step S35). If T×2 is out of this range (step S35: NO), the parameter "m" is incremented by one (step S36), and the flow returns to the step S33.

On the other hand, if T×2 is greater than 15×m and less than or equal to 15×(m+1) (step S35: YES), the parameter "n" is set as n=T×2−15×m (step S37). It is further judged whether or not the value of the parameter "n" at that time is zero (0) (step S38). If the parameter "n" is zero (0) (step S38: YES), it is regarded that the desired video data 42 is recorded in the VOB unit 30 having the navi-pack 41 obtained in the step S34. If this is the case, the flow jumps to a step S31 to start reproducing and outputting the video data. If the parameter "n" is not zero (n≠0) (step S38: NO), the start address of the VOB unit 30 having the navi-pack 41 updated at the step S34 is set to "FWDAy" on the basis of the VOB unit search information within the updated navi-pack 41, such that the address corresponding to "FWDAn" equals the address corresponding to "FWDAy" (step S39).

After that, the steps S29 through S31 are executed, and the flow returns to the normal reproduction (step S20).

In this way, the time search by use of the VOB unit search information is executed.

As described above, according to the reproducing apparatus SS2, by performing the scan operation or the time search operation by use of the above described VOB unit search information, it is possible to speedily search and reproduce the video information even during the angle block reproduction or parental block reproduction, without interrupting the angle block reproduction or parental block reproduction. In other words, the angle block reproduction or parental block reproduction can be performed while reproducing the video information precisely and smoothly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording apparatus comprising:

signal processing means for applying a predetermined signal processing to record information that includes a plurality of partial record information blocks, and for generating a plurality of processed partial record information blocks each of which includes a plurality of information units, each information unit including one or a plurality of reproduction units;

navigation information generating means for generating navigation information including recording position information indicating recording positions of a plurality of other reproduction units that belong to the same processed partial record information block, corresponding to a predetermined reproduction time of the partial record information blocks within a predetermined range before and after a respective one of the reproduction units on an axis of reproduction time of each of the partial record information blocks, wherein each partial record information block includes the corresponding navigation information;

multiplexing means for multiplexing the plurality of processed partial record information blocks and the navigation information so that each reproduction unit includes the navigation information, thereby obtaining multiplexed partial record information; and recording means for recording the multiplexed partial record information onto an information recording medium.

2. The information recording apparatus according to claim 1, wherein:

the record information includes at least video information, the partial record information blocks are to be reproduced at the same reproduction time on the axis of reproduction time, and each of the partial record information blocks comprises the video information of the same object taken from different viewpoints.

3. The information recording apparatus according to claim 1, wherein the partial record information blocks are to be reproduced by information reproducing apparatuses having different setting modes.

4. An information recording medium to be reproduced by a reproducing apparatus, the information recording medium comprising:

a plurality of processed partial record information blocks generated by applying a predetermined signal processing to record information including a plurality of partial record information blocks, each processed partial record information block including a plurality of information units;

a plurality of reproduction units, each information unit comprising one or more of the reproduction units; and navigation information included in each of the corresponding reproduction units, the navigation information including recording position information indicating recording positions of a plurality of other reproduction units that belong to the same processed partial record information block, corresponding to a predetermined reproduction time of the partial record information blocks within a predetermined range before and after a respective one of the reproduction units on an axis of reproduction time of each of the partial record information blocks.

5. The information recording medium according to claim 4, wherein:

the record information includes at least video information, the partial record information blocks are to be reproduced at the same reproduction time on the axis of reproduction time, and each of the partial record information blocks comprises the video information regarding the same object taken from different viewpoints.

6. The information recording medium according to claim 4, wherein the partial record information blocks are to be reproduced by information reproducing apparatuses having different setting modes.

7. An information reproducing apparatus for reproducing information recorded on an information recording medium comprising:

a plurality of processed partial record information blocks generated by applying a predetermined signal processing to record information including a plurality of partial record information blocks, each processed partial record information block including a plurality of information units;

a plurality of reproduction units, each information unit comprising one or more of the reproduction units; and navigation information included in each of the corresponding reproduction units, the navigation information including recording position information indicating recording positions of a plurality of other reproduction units that belong to the same processed partial record information block, corresponding to a predetermined reproduction time of the partial record information blocks within a predetermined range before and after a respective one of the reproduction units on an axis of reproduction time of each of the partial record information blocks, the information reproducing apparatus comprising:

detection and demodulation means for detecting and demodulating information recorded on the recording medium to thereby obtain a demodulation signal;

extracting means for extracting the recording position information out of the demodulation signal; and control means for controlling reproduction of information on a basis of the extracted recording position information.

8. The information reproducing apparatus according to claim 7, wherein:

the record information includes at least video information, the partial record information blocks are to be reproduced at the same reproduction time on the axis of reproduction time, and each of the partial record information blocks comprises the video information regarding the same object taken from different viewpoints.

9. The information reproducing apparatus according to claim 7, wherein the partial record information blocks are to be reproduced by information reproducing apparatuses having different setting modes.

10. The information reproducing apparatus according to claim 7, further comprising input means for instructing a scan operation at a faster speed than during a normal reproduction, wherein the control means controls the scan operation on the basis of the extracted recording position information.

11. The information reproducing apparatus according to claim 7, further comprising input means for instructing a time search operation to perform reproduction at a specific address, wherein the control means controls the time search operation on the basis of the extracted recording position information.

12. An information recording medium to be reproduced by a reproducing apparatus, comprising:

a plurality of information blocks, each of which includes a plurality of interleaved units;

a plurality of object units, each interleaved unit comprising one or more of the object units; and navigation information included in each of the corresponding object units and positioned at a forefront of each of the object units, wherein the navigation information includes recording position information indicating recording positions of a plurality of other object units that belong to the same information block within a predetermined range before and after an object unit in which the recording position information is included on an axis of reproduction time of an information block to which the object unit belongs.

13. The information recording medium according to claim 12, wherein:

the record information includes at least video information, the information blocks are to be reproduced at the same reproduction time on the axis of reproduction time, and each of the information blocks comprises the video information regarding the same object taken from different viewpoints.

14. The information recording medium according to claim 12, wherein the information blocks are to be reproduced by information reproducing apparatuses having different setting modes.

15. An information reproducing apparatus for reproducing information recorded on an information recording medium comprising:

a plurality of information blocks, each of which includes a plurality of interleaved units;

a plurality of object units, each interleaved unit comprising one or more of the object units; and navigation information included in each of the corresponding object units and positioned at a forefront of each of the object units, the navigation information including recording position information indicating recording positions of a plurality of other object units that belong to the same information block within a predetermined range before and after an object unit in which the recording position information is included on an axis of reproduction time of an information block to which the object unit belongs, the information reproducing apparatus comprising:

detection and demodulation means for detecting and demodulating information recorded on the recording medium to obtain a demodulation signal;

extracting means for extracting the recording position information out of the demodulation signal; and control means for controlling reproduction of information on the basis of the extracted recording position information.

16. The information reproducing apparatus according to claim 15, wherein:

the record information includes at least video information, the information blocks are to be reproduced at the same reproduction time on the axis of reproduction time, and each of the information blocks comprises the video information regarding the same object taken from different viewpoints.

17. The information reproducing apparatus according to claim 15, wherein the information blocks are to be reproduced by information reproducing apparatuses having different setting modes.

18. The information reproducing apparatus according to claim 15, further comprising input means for instructing scan operation at a faster speed than during a normal reproduction, wherein the control means controls the scan operation on the basis of the extracted recording position information.

19. The information reproducing apparatus according to claim 15, further comprising input means for instructing time search operation to perform reproduction at a specific address, wherein the control means controls the time search operation on the basis of the extracted recording position information.

* * * * *